UNITED STATES PATENT OFFICE.

THOMAS A. EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

PROCESS OF MAKING METALLIC FLAKES OR SCALES.

No. 821,627.     Specification of Letters Patent.     Patented May 29, 1906.

Application filed March 30, 1905. Serial No. 252,934.

*To all whom it may concern:*

Be it known that I, THOMAS ALVA EDISON, a citizen of the United States, residing at Llewellyn Park, Orange, county of Essex, and State of New Jersey, have invented a certain new and useful Process of Making Metallic Flakes or Scales, of which the following is a description.

My invention relates to a process for making metallic flakes or scales, particularly for use in connection with my improved storage battery as a conducting substance for admixture with the active material (nickel hydroxid) in the positive electrode.

The process is adapted particularly for use in the manufacture of scales or flakes of metallic cobalt; but it may be also employed for making scales or flakes of a nickel-cobalt alloy, although the results are not so perfect as when the scales or flakes are made of cobalt alone. The advantage of using cobalt as the metal from which the scales or flakes are to be wholly or partly made is, as I have pointed out in concurrent applications, the high character of contact which can be obtained with that metal. I find that the scales or flakes in question can be produced by a process of sublimation and that the resulting product will be of great purity and of such effective covering power that a very small weight of the conducting-flakes is necessary to secure effective contact between the active particles.

Assuming the process to be carried on in connection with the manufacture of scales or flakes of metallic cobalt, I proceed substantially as follows: Chlorid of cobalt is heated in a closed chamber and subjected to a slow stream of carbonic acid, whereby the chlorid will be vaporized, and the vapor is conducted to a suitable settling-chamber in which the chlorid deposits in the form of very beautiful scale-like crystals, the operations being thus carried out by the ordinary process of sublimation. The chlorid crystals are now removed and treated in a warm potash solution until the mass has been completely reduced to the hydroxid state without, however, altering the scale-like or crystalline structure thereof. The cobalt hydroxid thus secured is now carefully washed and dried and subjected to the reducing action of hydrogen-gas in a heated retort until the scales or flakes have been completely reduced to the metallic condition. The resulting metallic flakes or scales can now be used directly with the active material in any suitable way, such as those referred to in my concurrent applications, without the necessity of further reducing or scaling operations. If it is desired to make scales or flakes of an alloy of nickel and cobalt, I find that this may be done by carrying out the process in exactly the same way, except that chlorid of nickel and chlorid of cobalt mixed together in the correct proportions are subjected to sublimation, the resulting scales forming a compound of the two chlorids, although the mixture is not so perfect as when the two hydroxids are precipitated or when made by electrodeposition, as I have described in my concurrent applications, Serial Nos. 252,933 and 252,932. Consequently for the manufacture of cobalt-nickel alloy I prefer to follow either of the latter processes rather than a process of sublimation.

Having now described my invention, what I claim as new therein, and desire to secure by Letters Patent, is as follows:

1. The process of making metallic scales or flakes which consists in subliming a metallic chlorid to form scale-like or crystalline flakes thereof, then in reducing the chlorid flakes to the hydroxid state, and finally in reducing the hydroxid to the metallic state, substantially as set forth.

2. The process of making scales or flakes of metallic cobalt, which consists in subliming chlorid of cobalt to deposit the same in the form of scale-like or crystalline flakes, then in reducing the chlorid flakes to the hydroxid state, and finally in reducing the hydroxid to the metallic state, substantially as set forth.

3. The process of making flakes or scales of nickel and cobalt, which consists in subliming mixed chlorids of nickel and cobalt to secure compound scale-like or crystalline flakes of the two chlorids, then in reducing the chlorid flakes to the hydroxid state, and finally in reducing the hydroxids to the metallic state, substantially as set forth.

This specification signed and witnessed this 29th day of March, 1905.

THOMAS A. EDISON.

Witnesses:
   FRANK L. DYER,
   ANNA R. KLEHM.